United States Patent [19]

Omori et al.

[11] Patent Number: 5,735,920
[45] Date of Patent: Apr. 7, 1998

[54] METHOD OF MANUFACTURING OPTICAL GLASS ELEMENT

[75] Inventors: Masaki Omori, Kawasaki; Hiroe Tanaka; Takeshi Nomura, both of Tokyo; Kiyoshi Yamamoto; Masayuki Tomida, both of Yokohama; Masashi Mashige; Shizuo Maruyama, both of Kawasaki, all of Japan

[73] Assignee: Canon Kabushiki Kaisha, Tokyo, Japan

[21] Appl. No.: 919,334

[22] Filed: Aug. 28, 1997

Related U.S. Application Data

[60] Continuation of Ser. No. 651,511, May 22, 1996, abandoned, which is a division of Ser. No. 254,064, Jun. 3, 1994, abandoned.

[30] Foreign Application Priority Data

Jun. 8, 1993 [JP] Japan .................................. 5-137774
May 24, 1994 [JP] Japan .................................. 6-109388

[51] Int. Cl.⁶ .................................................. C03B 11/16
[52] U.S. Cl. .................. 65/29.18; 65/29.19; 65/29.21; 65/64; 65/102
[58] Field of Search ................................ 65/29.12, 29.16, 65/29.18, 29.19, 29.21, 64, 102

[56] References Cited

U.S. PATENT DOCUMENTS

| 2,466,510 | 4/1949 | Sun et al. ........................ 501/903 X |
| 2,511,226 | 6/1950 | Sun et al. ........................ 501/903 X |
| 2,512,993 | 6/1950 | Bastick et al. ................... 501/903 X |
| 3,954,484 | 5/1976 | Broemer et al. ................. 501/903 X |
| 4,343,908 | 8/1982 | Faulstich et al. ....................... 501/78 |
| 4,438,211 | 3/1984 | Mennemann et al. ................... 501/65 |
| 5,026,415 | 6/1991 | Yamamoto et al. .................... 65/305 |
| 5,032,159 | 7/1991 | Kuwabara et al. ....................... 65/64 |
| 5,202,156 | 4/1993 | Yamamoto et al. ................... 427/135 |
| 5,320,985 | 6/1994 | Enomoto ................................ 501/57 |
| 5,340,778 | 6/1993 | Kloss et al. ............................ 501/52 |
| 5,346,522 | 9/1994 | Komiyama et al. ..................... 65/64 |
| 5,435,818 | 7/1995 | Mashige et al. .................... 65/29.12 |

*Primary Examiner*—Donald E. Czaja
*Assistant Examiner*—Sean Vincent
*Attorney, Agent, or Firm*—Fitzpatrick, Cella, Harper & Scinto

[57] ABSTRACT

A manufacturing method for an optical glass element having a refractive index equal to a design value after press-molding. A glass material of specified composition is melted and press-molded while it is in the molten state. The refractive index of the glass material is calculated by substracting a change in the refractive index of the glass material resulting from the press-molding from a required refractive index for a molded glass element.

2 Claims, 3 Drawing Sheets

FIG. 3

| WT % | SiO2 | B2O3 | Al2O3 | Li2O | Na2O | K2O | SrO | BaO | ZnO | Sb2O3 |
|---|---|---|---|---|---|---|---|---|---|---|
| | 47.40 | 9.45 | 3.88 | 5.95 | 1.59 | 0.56 | 0.08 | 26.40 | 3.57 | 0.31 |

FIG. 4

| WT % | SiO2 | B2O3 | Al2O3 | Li2O | Na2O | CaO | BaO | ZrO2 | La2O3 | Gd2O3 | As2O3 |
|---|---|---|---|---|---|---|---|---|---|---|---|
| | 20.0 | 23.0 | 1.5 | 5.4 | 0.04 | 13.0 | 3.0 | 0.53 | 19.0 | 14.0 | 0.22 |

METHOD OF MANUFACTURING OPTICAL GLASS ELEMENT

This application is a continuation of application Ser. No. 08/651,511 filed May 22, 1996, now abandoned, which is a division of application Ser. No. 08/254,064, filed Jun. 3, 1994, now abandoned.

BACKGROUND OF THE INVENTION

The present invention relates to a method of manufacturing an optical glass element, such as an aspherical lens, having a high accuracy and a desired refractive index, by using press molding.

Recently, a method of manufacturing an optical glass element, such as a glass lens, for use in an optical instrument, without performing any polishing step has been proposed, by which an optical glass material is supplied into a molding die having a molding surface with a predetermined surface accuracy and press-molded by this molding die. Generally, however, if a glass material is press-molded in a high-temperature softened state, the optical characteristics, particularly, the refractive index of the molded optical glass element largely changes from that of the glass material before the press molding depending on the cooling conditions after the press molding. Therefore, to restore the original refractive index, annealing is performed to adjust the refractive index after precision press.

This annealing step, however, requires a heat cycle of several hours and hence increases the manufacturing cost in the manufacture of optical glass elements.

SUMMARY OF THE INVENTION

The present invention has been made in consideration of the above situations and has as its principal object to provide a manufacturing method capable of giving an optical glass element a refractive index equal to a design value after press molding.

It is another object of the present invention to provide a method capable of manufacturing a high-accuracy optical glass element more economically by omitting annealing.

To solve the above conventional problem and to achieve the above objects, an optical element manufacturing method according to the present invention is characterized by the following arrangement.

That is, in a method of manufacturing an optical glass element by melting and heating a glass material with a preselected composition, and press-molding the glass material in the molten state, the optical glass element is molded by the press-molding step by using a glass material having a refractive index calculated by subtracting a change in the refractive index of a glass material, which is to be caused in the press-molding step, from a refractive index required for a molded optical glass element.

In addition, an optical glass element according to the first aspect of the present invention is characterized by the following arrangement.

More specifically, an optical glass element is so formed as to have refractive index $n_d$=1.54 to 1.75 and Abbe's number $v_d$=50 to 65 by press-molding a glass material having a refractive index calculated by subtracting a change in the refractive index of a glass material, which is to be caused in the press-molding step, from a refractive index required for a molded optical glass element, the glass material being either selected from glass materials each containing at least one of $SiO_2$, BaO, and $B_2O_3$ in a glass composition in which BaO is 40 wt % or less and/or $SiO_2$ is 60 wt % or less, or being adjusted in glass composition.

Furthermore, an optical glass element according to the second aspect of the present invention is characterized by the following arrangement.

That is, an optical glass element is so formed as to have refractive index $n_d$=1.58313 (tolerance±0.00030) and Abbe's number $v_d$=59.4 (tolerance±0.20) by press-molding a glass material having a refractive index calculated by subtracting a change in the refractive index of a glass material, which is to be caused in the press-molding step, from a refractive index required for a molded optical glass element, the glass material being obtained by adding 1.5 wt % or less of $SiO_2$ and/or 3.5 wt % or less of BaO to the composition of a glass material containing at least one of $SiO_2$, BaO, and $B_2O_3$ in the glass composition. Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 3 is a table showing the composition of the glass material used in Embodiment 1;

FIG. 4 is a table showing the composition of the glass material used in Embodiment 2;

DETAILED DESCRIPTION OF THE PREFERRED EMBODIMENTS

The preferred embodiments of the present invention will be described in detail below with reference to the accompanying drawings. In each embodiment, unlike in conventional methods, a change in the refractive index of glass, which is to be caused by press molding, is calculated beforehand. A glass material is so chosen or adjusted as to have a desired refractive index by subtracting or adding the calculated increase or decrease in the refractive index from or to the refractive index of a final product. Therefore, an optical element with a desired design value can be obtained as the final product, so annealing for adjusting the refractive index can be omitted.

In addition, the residual strain of an optical glass element obtained by the method of each embodiment is normally 30 nm or less, as birefringence, when molding is performed by precision press. Therefore, except in situations where the index of birefringence of an optical glass element is of importance, the optical glass element of the present invention has no influence on the performance of a product in the field of, e.g., camera lenses or video lenses.

The aspects of the preferred embodiments of the present invention will be described in more detail below. The method of adjusting the refractive index of glass before the glass is press-molded is not particularly limited. However, it is desirable to use a method which adjusts the refractive index by altering the composition of glass. Any conventional method can be used as this method of adjusting the refractive index by changing the glass composition. In each embodiment, the change in the refractive index of glass is effective when it is $10 \times 10^{-5}$ to $600 \times 10^{-5}$ (this range corresponds to Abbe's number $v_d$ change amount=0.61 to 0.01 during molding), and is very effective when it is $350 \times 10^{-5}$ or more. Note that the optical glass element of the present invention uses a glass material with a refractive index of 1.54 to 1.75 as optical glass since the material causes relatively little chromatic aberration when used singly.

The press-molding method employed in each embodiment is not particularly limited. For example, it is possible to use any of various conventional methods in which a glass material in a softened state in a molding die is press-molded by a die member, thereby forming an optical function surface corresponding to the molding surface of the die member. Note that in each embodiment, the press-molding step includes not only a step of pressurizing glass in a molding die but a step before or after the press, which causes the refractive index of glass to change.

(Embodiment 1)

Figure 2:
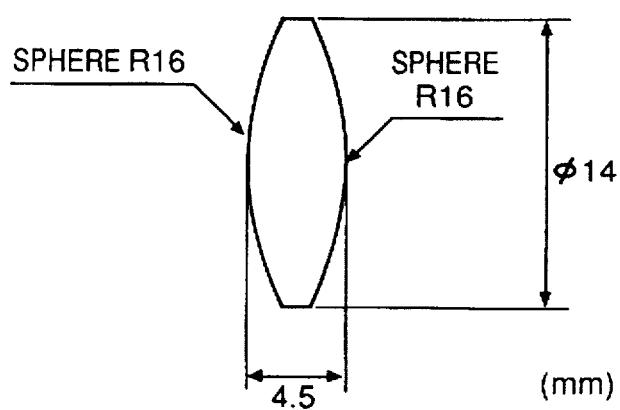
FIG. 2 is a view showing the convex lens manufactured in Embodiment 1.

In this embodiment, the following steps were performed to manufacture an optical glass element with a refractive index $n_d$ of 1.58313 as a desired design value, e.g., a glass convex lens having the shape illustrated in FIG. 2. First, commercially available glass material (nd=1.58313) was prepared. This glass has the composition shown in FIG. 3.

Figure 1:
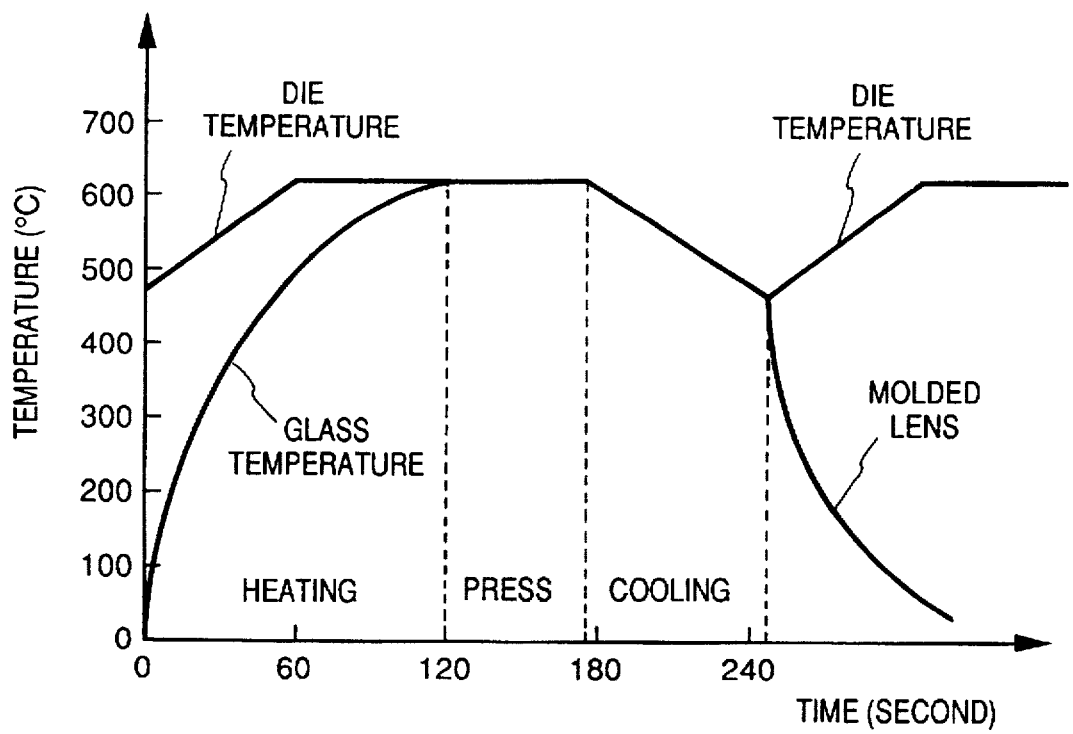
FIG. 1 is a graph showing the heat cycles of glass and a molding die in press molding performed in Embodiments 1 and 2.

Subsequently, to check the change in refractive index caused by press molding, the refractive index of the glass material was actually measured. The results were refractive index=1.58297 (which is within the range of an allowable error of the set refractive index of that commercially available glass material) and Abbe's number $v_d$=59.38. A spherical glass material cut out from a block material of this glass was heated and press-molded by using a molding die. FIG. 1 shows the temperature histories of the die and the glass during the press molding. As shown in FIG. 1, the glass material was placed on the molding surface of a bottom tool at about 100° C. and heated up to a press temperature of 620° C. While the material was held at this temperature, a top force was moved downward to perform press molding for 50 seconds. Thereafter, the temperature was decreased to 460° C. over 85 seconds, and the molded optical glass element (molded lens) was extracted from inside the die and rapidly cooled to room temperature. The resultant optical glass element (molded lends) with this temperature history was found to have a refractive index of 1.58032 and Abbe's number $v_d$=59.11. That is, the refractive index was smaller by 0.00265 (the Abbe's number $v_d$ was smaller by −0.27) than that before the molding.

Of the composition of this glass, the BaO content was increased from 26.40 to 27.74 wt %, and the SiO$_2$ content was decreased from 47.40 to 46.06 wt %, thereby preparing glass with a refractive index of 1.58578 (larger by 0.00265 than the desired refractive index). In this case, Abbe's number $v_d$=59.65.

The spherical glass whose refractive index was adjusted in this way was used to perform press molding with the temperature history illustrated in FIG. 1. Consequently, an optical glass element (molded lens) having the shape shown in FIG. 2 was obtained. This element was found to have a refractive index $n_d$ of 1.58313 (=desired value) and Abbe's number $v_d$=59.38, requiring no refractive index adjustment by annealing, which is normally necessary after the molding. The birefringence of the element was also measured and found to be 10 nm or less. In addition, even after the durability tests conducted in the atmosphere at 150° C. for 240 hours and at 70° C. and a humidity of 85% for 1,000 hours, the element caused no change in shape and refractive index, i.e., had no problem in performance.

(Embodiment 2)

In Embodiment 2, press molding was performed by using, in place of the spherical glass cut out from the block material in the above embodiment, a glass material (to be referred to as a blank hereinafter) formed directly from molten glass into a shape close to that of a molded product and having the same shape and the same glass type as those of the glass used in the above embodiment (an optical glass element was formed by the same process under the same conditions as in Embodiment 1 except that this blank was press-molded). As in Embodiment 1, the optical glass element (molded lens) of interest had refractive index=1.57981 (Abbe's number $v_d$=60.04), while refractive index=1.57865 (Abbe's number $v_d$=59.92) before the molding. That is, it was found that the refractive index was increased by 0.00116 (the Abbe's number $v_d$ was increased by +0.12) by the press molding.

Of the composition of the glass, therefore, the BaO content was decreased from 26.40 to 25.81 wt %, and the SiO$_2$ content was increased from 47.40 to 47.99 wt %, thereby preparing glass with a refractive index of 1.58197 (smaller by 0.00226 than the desired refractive index). In this case, Abbe's number $v_d$=59.26.

By using the blank whose refractive index was adjusted in this manner, press molding with the temperature history shown in FIG. 1 was performed to form an optical glass element (molded lens) having the shape illustrated in FIG. 2. This glass lens was found to have a refractive index $n_d$ of 1.58313 (=desired value) and Abbe's number $v_d$=59.38. The birefringence of the element was also measured and found to be 10 nm or less. In addition, even after the durability tests conducted in the atmosphere at 150° C. for 240 hours and at 70° C. and a humidity of 85% for 1,000 hours, the element caused no change in shape and refractive index, i.e., had no problem in performance.

(Embodiment 3)

This embodiment is different from Embodiment 2 above in that glass with a refractive index of 1.58197 (smaller by 0.00226 than the desired refractive index) was prepared by increasing only the SiO$_2$ content of the composition of the glass from 47.40 to 49.33 wt %. In this case, Abbe's number $v_d$=59.26.

By using the blank whose refractive index was adjusted in this manner, press molding with the temperature history shown in FIG. 1 was performed to obtain an optical glass element (molded lens) having the shape illustrated in FIG. 2. This glass lens was found to have a refractive index $n_d$ of 1.58313 (=desired value) and Abbe's number $v_d$=59.38. The birefringence of the element was also measured and found to be 10 nm or less. In addition, even after the durability tests conducted in the atmosphere at 150° C. for 240 hours and at 70° C. and a humidity of 85% for 1,000 hours, the element caused no change in shape and refractive index, i.e., had no problem in performance.

(Embodiment 4)

Figure 6:
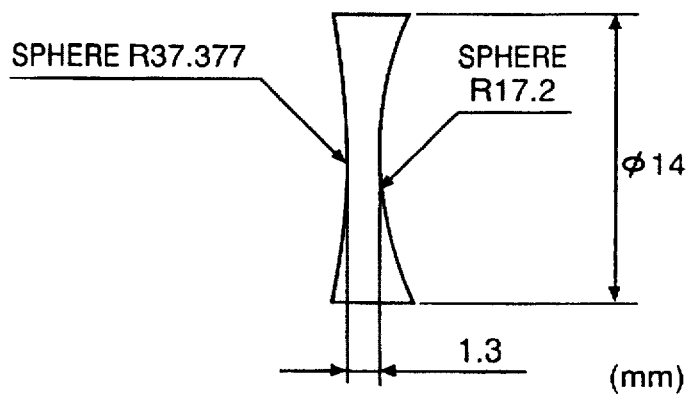
FIG. 6 is a view showing the concave lens manufactured in Embodiment 4.

In this embodiment, the following steps were performed to manufacture an optical glass element with a refractive index $n_d$ of 1.69910 as a desired design value, e.g., a glass concave lens having $\phi$=14 mm, t=1.3 mm, R$_1$=37.377 mm, and R$_2$=17.2 mm (see FIG. 6). As a glass material, commercially available glass material with a refractive index $n_d$ of 1.69910 was used. The composition of this glass is as shown in FIG. 4.

Figure 5:
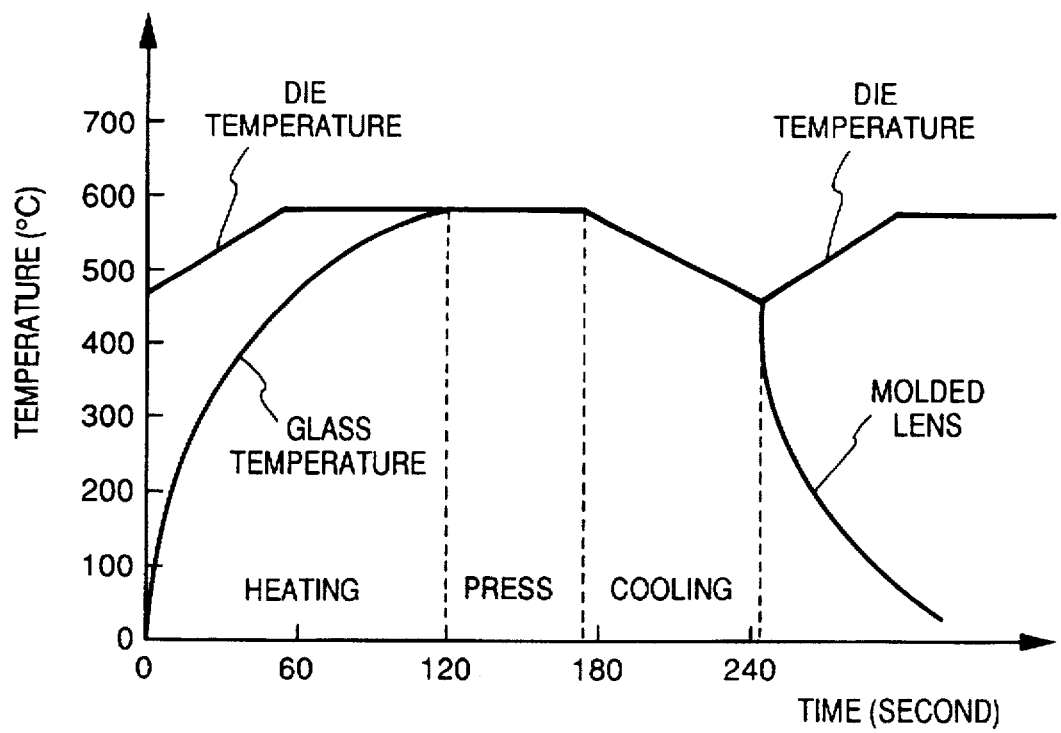
FIG. 5 is a graph showing the heat cycles of glass and a molding die in press molding performed in Embodiment 4.

As in Embodiment 1, to check the change in refractive index caused by press molding, the refractive index of the above glass material was actually measured. The results were refractive index =1.69910 (which is within the range of an allowable error of the set refractive index of that commercially available glass) and Abbe's number $v_d$=55.40. A spherical glass material cut out from a block material of this glass was heated and press-molded by using a molding die. FIG. 5 shows the temperature histories of the die and the glass during the press molding. As in FIG. 5, the glass material was placed on the molding surface of a bottom tool at about 100° C. and heated up to a press temperature of 590° C. While the material was held at this temperature, a top force was moved downward to perform press molding for 50 seconds. Thereafter, the temperature was decreased to 460° C. over 85 seconds, and the molded optical glass element (molded lens) was extracted from inside the die and rapidly cooled to room temperature. The resultant optical glass element (molded lends) with this temperature history was found to have a refractive index of 1.66532 and Abbe's number $v_d$=54.98. That is, the refractive index was smaller by 0.00378 (the Abbe's number $v_d$ was smaller by −0.42) than that before the molding.

Of the composition of this glass, the BaO content was increased from 3.00 to 4.91 wt %, and the SiO$_2$ content was decreased from 20.00 to 18.09 wt %, thereby preparing glass with a refractive index of 1.70288 (larger by 0.00378 than the desired refractive index). In this case, Abbe's number $v_d$=55.82.

The spherical glass whose refractive index was adjusted in this way was used to perform press molding with the temperature history illustrated in FIG. 5. Consequently, an optical glass element (molded lens) having a desired shape was obtained. This element was found to have a refractive index $n_d$ of 1.69910 (=desired value) and Abbe's number $v_d$=55.40, requiring no refractive index adjustment by annealing, which is normally necessary after the molding. The birefringence of the element was also measured and found to be 10 nm or less. In addition, even after the durability tests conducted in the atmosphere at 150° C. for 240 hours and at 70° C. and a humidity of 85% for 1,000 hours, the element caused no change in shape and refractive index, i.e., had no problem in performance.

The embodiments of the press molding using spherical glass cut out from a block material and of the press molding using a blank have been discussed above, but the present invention is not limited to these embodiments. As an example, it is particularly effective in the present invention to use a method (to be referred to as direct press hereinafter) in which a desired amount of a glass gob obtained from molten glass is supplied directly into a press tool to perform press molding, thereby manufacturing an optical glass element having a surface with a desired shape accuracy.

A representative example of this direct press includes a step (A) of extracting a desired amount of a glass material from glass in a molten state at a temperature at which the glass viscosity is 10$^{-2}$ to 10$^4$ dPa.s, a step (B) of adjusting the extracted glass material to have a temperature at which the glass viscosity is 10$^4$ to 10$^{10}$ dPa.s, a step (C) of supplying the temperature-controlled glass into a press tool adjusted to have a temperature at which the glass viscosity is 10$^{11}$ to 10$^{14}$ dPa.s, and a step of press-molding the glass material by applying a load on the press tool.

This direct press eliminates the formation of a high-accuracy glass preform and makes it possible to use a glass gob, which is extracted directly from molten glass and controlled at a predetermined temperature, as a glass preform. Additionally, a tool for forming the preform is unnecessary, and this makes a large number of steps such as preforming using this preforming tool unnecessary. Consequently, the molding tact becomes short, and this results in a simple optical glass element manufacturing method as a whole. In this method, however, the change in the refractive index of glass caused by the press molding is relatively large. Therefore, the method of the present invention is applied to this method to adjust the refractive index change. This makes the manufacturing method of the present invention very useful and also makes it feasible to further shorten the molding tact.

It is also desirable that this direct press further include a step of extracting the molded glass from the molding die at a temperature at which the glass viscosity is 10$^{10}$ to 10$^{13}$ dPa.s, and a step of cooling the extracted molded glass to a temperature at which the glass viscosity is 10$^{14}$ dPa.s, at a cooling rate of 10° C./min or higher.

In summary, the present invention as has been discussed above is as follows.

The first characteristic feature of the present invention is that, in a method of manufacturing an optical glass element by melting and heating a glass material with a preselected composition, and press-molding the glass material in the molten state, the optical glass element is molded by the press-molding step by using a glass material having a refractive index calculated by subtracting a change in the refractive index of a glass material, which is to be caused in the press-molding step, from a refractive index required for a molded optical glass element. This method preferably includes the step of adjusting the glass material to have the refractive index calculated by subtracting the change in the refractive index from the refractive index required for the molded optical glass element, by altering the composition of the glass.

The second characteristic feature of the present invention is that the press-molding step described above comprises the substeps of extracting a desired amount of the glass material from the glass in the molten state at a temperature at which the glass viscosity is 10$^{-2}$ to 10$^4$ dPa.s, adjusting the extracted glass material to have a temperature at which the glass viscosity is 10$^4$ to 10$^{10}$ dPa.s, supplying the temperature-controlled glass material into a press tool adjusted to have a temperature at which the glass viscosity is 10$^{10}$ to 10$^{14}$ dPa.s, and press-molding the glass material by applying a load on the press tool.

The third characteristic feature of the present invention is an optical glass element so formed as to have refractive index $n_d$=1.54 to 1.75 and Abbe's number $v_d$=50 to 65 by press-molding a glass material having a refractive index calculated by subtracting a change in the refractive index of a glass material, which is to be caused in the press-molding step, from a refractive index required for a molded optical glass element, the glass material being either selected from glass materials each containing at least one of SiO$_2$, BaO, and B$_2$O$_3$ in a glass composition in which BaO is 40 wt % or less and/or SiO$_2$ is 60 wt % or less, or being adjusted in glass composition. Alternatively, an optical glass element is so formed as to have refractive index $n_d$=1.58313 (tolerance ±0.00030) and Abbe's number $v_d$=59.4 (tolerance ±0.20) by press-molding a glass material having a refractive index calculated by subtracting a change in the refractive index of a glass material, which is to be caused in the press-molding step, from a refractive index required for a molded optical element, the glass material being obtained by adding 2.5 wt % or less of $SiO_2$ and/or 3.5 wt % or less of BaO to the composition of a glass material containing at least one of $SiO2$, BaO, and $B_2O_3$ in the glass composition.

According to the embodiments of the present invention as described above, the change in the refractive index caused by the press molding is adjusted in advance with respect to the refractive index of a glass material. Therefore, a refractive index equal to a design value can be obtained after the press molding. Additionally, since the annealing step is eliminated, high-accuracy optical glass elements can be press-molded more economically.

The present invention is not limited to the above embodiments and various changes and modifications can be made within the spirit and scope of the present invention. Therefore, to apprise the public of the scope of the present invention the following claims are made.

What is claimed is:

1. A method of manufacturing an optical glass element having a required refractive index, comprising the steps of:

(a) selecting a glass material such that a refractive index of said material before press molding in a molten state differs from a refractive index of said material after said press molding by a value between $10 \times 10^{-5}$ and $600 \times 10^{-5}$;

(b) melting and heating said glass material to achieve a molten state;

press-molding said glass material at predetermined molding conditions;

(d) measuring a difference between a refractive index of said glass material before said press-molding and a refractive index of said glass material after said press-molding;

(e) changing the composition of said glass material to have a refractive index calculated by subtracting said difference measured in step (d) from the required refractive index, by adding at least one member selected from the group consisting of $SiO_2$, BaO, and $B_2O_3$ to said glass material;

(f) press-molding a glass material of a composition determined in step (e) at said predetermined molding conditions; and (g) repeating said steps (d), (e) and (f) until the required refractive index is obtained, and using the final composition of the glass material for production of the optical glass element.

2. The method according to claim 1, wherein the press-molding steps further comprise the steps of:

selecting a quantity of said glass material in the molten state to be press-molded, wherein the viscosity of said glass material is $10^{-2}$ to $10^4$ dPa.s;

cooling said glass material to a temperature at which the viscosity of said glass material is $10^4$ to $10^{10}$ dPa.s;

transferring said cooled glass material into a press tool maintained at a temperature at which the viscosity of said glass material is $10^{11}$ to $10^{14}$ dPa.s; and press-molding said glass material by applying pressure on said press tool.

* * * * *

UNITED STATES PATENT AND TRADEMARK OFFICE
CERTIFICATE OF CORRECTION

PATENT NO. : 5,735,920

DATED : April 7, 1998

INVENTOR(S) : MASAKI OMORI ET AL.

It is certified that error appears in the above-identified patent and that said Letters Patent is hereby corrected as shown below:

Title page,
AT 57] ABSTRACT

Line 6, "stracting" should read --tracting--.

COLUMN 2

Line 16, "Other" should read --¶ Other--.

COLUMN 3

Line 30, "(nd" should read --($n_d$--; and
    Line 50, "lends)" should read --lens)--.

COLUMN 5

Line 21, "lends)" should read --lens)--.

COLUMN 6

Line 47, "$10^{10}$" should read --$10^{11}$--.

UNITED STATES PATENT AND TRADEMARK OFFICE
CERTIFICATE OF CORRECTION

PATENT NO. : 5,735,920
DATED : April 7, 1998
INVENTOR(S) : MASAKI OMORI ET AL.

It is certified that error appears in the above-identified patent and that said Letters Patent is hereby corrected as shown below:

COLUMN 7

Line 26, "press-molding" should read
-- (c) press-molding--.

Signed and Sealed this

Ninth Day of February, 1999

Attest:

Attesting Officer

*Acting Commissioner of Patents and Trademarks*